United States Patent
Hong et al.

(10) Patent No.: US 10,595,245 B2
(45) Date of Patent: Mar. 17, 2020

(54) METHOD AND APPARATUS FOR MANAGING WIRELESS CONNECTION SWITCHING

(71) Applicant: AVAGO TECHNOLOGIES INTERNATIONAL SALES PTE. LIMITED, Singapore (SG)

(72) Inventors: Wei Hong, Beijing (CN); Erlin Zeng, Beijing (CN); Na Wei, Beijing (CN); Haiming Wang, Beijing (CN)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 110 days.

(21) Appl. No.: 14/782,082

(22) PCT Filed: Apr. 3, 2013

(86) PCT No.: PCT/CN2013/073750
§ 371 (c)(1),
(2) Date: Oct. 2, 2015

(87) PCT Pub. No.: WO2014/161194
PCT Pub. Date: Oct. 9, 2014

(65) Prior Publication Data
US 2016/0057669 A1    Feb. 25, 2016

(51) Int. Cl.
*H04W 36/04*    (2009.01)
*H04W 36/00*    (2009.01)
(Continued)

(52) U.S. Cl.
CPC ....... *H04W 36/04* (2013.01); *H04W 36/0077* (2013.01); *H04W 68/005* (2013.01);
(Continued)

(58) Field of Classification Search
CPC ............... H04W 72/042; H04W 68/02; H04W 72/0406; H04W 88/08; H04W 88/02; H04W 84/12; H04W 88/06
See application file for complete search history.

(56) References Cited

U.S. PATENT DOCUMENTS

| 7,733,824 B2 | 6/2010 | Hellgren et al. |
| 2005/0002346 A1* | 1/2005 | Bichot ........... H04W 68/00 370/312 |

(Continued)

FOREIGN PATENT DOCUMENTS

| CN | 101199231 | 6/2008 |
| CN | 101682862 | 3/2010 |
| CN | 102318237 | 1/2012 |

OTHER PUBLICATIONS

International Search Report dated Jan. 16, 2014 in PCT/CN2013/073750 filed Apr. 3, 2013.

*Primary Examiner* — Asad M Nawaz
*Assistant Examiner* — Najeeb Ansari
(74) *Attorney, Agent, or Firm* — Xsensus, LLP

(57) ABSTRACT

A method, apparatus, and computer program product are provided to manage wireless connection switching. In the context of a method, an Access Point (AP) may determine whether to direct at least one User Equipment (UE) connected to a local area AP to be connected to a macro AP and may cause, in an instance in which it is determined to direct the at least one UE to be connected to the macro AP, at least one signal to be transmitted to the at least one UE, the at least one signal being configured to direct the at least one UE to connect to the macro AP. The signal may take many different forms and may encode further information such as the portion of the traffic that should be served by the macro AP, a particular Physical Random Access Channel (PRACH)

(Continued)

resource to be used by the UE, and/or other types of information and/or parameters.

16 Claims, 5 Drawing Sheets

(51) Int. Cl.
  *H04W 88/08* (2009.01)
  *H04W 84/12* (2009.01)
  *H04W 88/06* (2009.01)
  *H04W 68/00* (2009.01)

(52) U.S. Cl.
  CPC ........... *H04W 84/12* (2013.01); *H04W 88/06* (2013.01); *H04W 88/08* (2013.01)

(56) References Cited

U.S. PATENT DOCUMENTS

| | | | |
|---|---|---|---|
| 2007/0010261 A1* | 1/2007 | Dravida | G01S 5/0009 455/456.3 |
| 2008/0318574 A1 | 12/2008 | Bi | |
| 2010/0332610 A1* | 12/2010 | Cherian | H04W 72/10 709/207 |
| 2011/0170469 A1* | 7/2011 | Watfa | H04W 48/17 370/312 |
| 2011/0222523 A1 | 9/2011 | Fu et al. | |
| 2012/0208542 A1* | 8/2012 | Yoshizawa | H04W 68/00 455/445 |
| 2013/0136072 A1* | 5/2013 | Bachmann | H04W 4/00 370/329 |
| 2013/0308497 A1* | 11/2013 | Novak | H04W 76/02 370/259 |
| 2014/0141779 A1* | 5/2014 | Yuk | H04W 56/00 455/434 |
| 2014/0256365 A1* | 9/2014 | Schmidt | H04W 4/90 455/466 |
| 2014/0269408 A1* | 9/2014 | Tetteh | H04L 45/02 370/254 |
| 2014/0321038 A1* | 10/2014 | Park | G06F 1/1681 361/679.09 |
| 2014/0378172 A1* | 12/2014 | Lim | H04W 68/12 455/458 |
| 2015/0282026 A1* | 10/2015 | Gupta | H04W 72/042 370/331 |
| 2015/0358891 A1* | 12/2015 | Bergstrom | H04W 76/10 370/329 |

* cited by examiner

*Paging message*

```
-- ASN1START

Paging ::=                       SEQUENCE {
    pagingRecordList                 PagingRecordList            OPTIONAL,   -- Need ON
    systemInfoModification           ENUMERATED {true}           OPTIONAL,   -- Need ON
    etws-Indication                  ENUMERATED {true}           OPTIONAL,   -- Need ON
    nonCriticalExtension             Paging-v890-IEs             OPTIONAL
}

Paging-v890-IEs ::=              SEQUENCE {
    lateNonCriticalExtension         OCTET STRING                OPTIONAL,   -- Need OP
    nonCriticalExtension             Paging-v920-IEs             OPTIONAL
}

Paging-v920-IEs ::=              SEQUENCE {
    cmas-Indication-r9               ENUMERATED {true}           OPTIONAL,   -- Need ON
    nonCriticalExtension             Paging-v12xx-IEs            OPTIONAL
}

PagingRecordList ::=             SEQUENCE (SIZE (1..maxPageRec)) OF PagingRecord
PagingRecord ::=                 SEQUENCE {
    ue-Identity                      PagingUE-Identity,
    cn-Domain                        ENUMERATED {ps, cs},
    ...
}

Paging-v12xx-IEs ::=             SEQUENCE {
    SwitchBack                       BOOLEAN,
    rach-ConfigDedicated             RACH-ConfigDedicated        OPTIONAL,   -- Need OP
    nonCriticalExtension             SEQUENCE {}                 OPTIONAL    -- Need OP
}
```

Figure 5

METHOD AND APPARATUS FOR MANAGING WIRELESS CONNECTION SWITCHING

TECHNOLOGICAL FIELD

An example embodiment of the present invention relates generally to wireless networks and, more particularly, to managing wireless connection switching, such as switching between a wide area communication network and a local area communication network.

BACKGROUND

ISM (industrial, scientific and medical) radio bands are license-exempt bands, which were originally reserved internationally for the use of RF energy for industrial, scientific and medical purposes other than communications. However, in recent years these bands have also been shared with license-free error-tolerant communications applications such as Wireless LANs (WLAN) and cordless phones in the 915 MHz, 2.450 GHz, and 5.800 GHz bands. A main usage on these ISM bands is "WiFi." While "WiFi" is not a technical term, the WiFi Alliance has generally enforced its use to describe only a narrow range of connectivity technologies including wireless local area network (WLAN) based on the IEEE 802.11, which is a set of standards carrying out WLAN communication in the 2.4, 3.6 and 5 GHz frequency bands: ISM band 2.4 GHz (WiFi 802.11b and 802.11g/n) and ISM band 5 GHz (WiFi 802.11a/n/ac).

Recent growth in data traffic driven by mobile applications on smart phone devices, tablets, etc. has continued to strain the capacity of today's networks. Therefore, network operators are increasingly utilizing un-licensed WiFi spectrum to cope with such network congestion. Using unlicensed spectrum is a cost-effective mean to add needed capacity to today's networks and, given the limited availability and high cost of licensed spectrum, this trend is expected to accelerate further as traffic demand continues to grow.

Accordingly, solutions for providing wireless connection switching that is as efficient and seamless as possible are needed.

BRIEF SUMMARY

A method, apparatus and computer program product are therefore provided according to an example embodiment in order to manage wireless connection switching. In this regard, the method, apparatus, and computer program product of an example embodiment may provide for the transmission of at least one signal that is configured to direct at least some traffic of a user equipment (UE) that is connected to a local (or macro) access point (AP) to connect to a macro (or local) AP. The signal may take many different forms and may, according to certain example embodiments, encode further information such as the portion of the UEs traffic that should be served by the macro (or local) AP, a particular Physical Random Access Channel (PRACH) resource to be used by the UE, and/or other types of information and/or parameters.

In one embodiment, a method is provided that includes determining whether to direct at least some traffic of at least one user equipment (UE) connected to a local area (or macro) access point (AP) to be connected to a macro (or local) AP. The method further includes causing, in an instance in which it is determined to direct the at least some traffic of at least one UE to be connected to the macro (or local) AP, at least one signal to be transmitted to the at least one UE, the at least one signal being configured to direct the at least some traffic of the at least one UE to connect to the macro (or local) AP.

In another embodiment, a method is provided that includes communicating with a local area (or macro) access point (AP), receiving at least one signal, determining whether the signal comprises an indication to connect traffic to a macro (or local) AP, and connecting at least some traffic to the macro (or local) AP in an instance in which the signal comprises an indication to connect at least some traffic to the macro (or local) AP.

In a further embodiment, an apparatus is provided that includes at least one processor and at least one memory storing program code instructions therein, the memory and program code instructions being configured to, with the processor, direct the apparatus to at least determine whether to direct at least some traffic of at least one user equipment (UE) connected to a local area (or macro) access point (AP) to be connected to a macro (or local) AP. The apparatus is further directed to cause, in an instance in which it is determined to direct the at least some traffic of at least one UE to be connected to the macro (or local) AP, at least one signal to be transmitted to the at least one UE, the at least one signal being configured to direct the at least some traffic of the at least one UE to connect to the macro (or local) AP.

In another embodiment, an apparatus is provided that includes at least one processor and at least one memory storing program code instructions therein, the memory and program code instructions being configured to, with the processor, direct the apparatus to at least communicate with a local area (or macro) access point (AP), receive at least one signal, determine whether the signal comprises an indication to connect traffic to a macro (or local) AP, and connect at least some traffic to the macro (or local) AP in an instance in which the signal comprises an indication to connect at least some traffic to the macro (or local) AP.

In a further embodiment, a computer program product is provided that includes a non-transitory computer readable medium storing computer program code portions therein, the computer program code portions being configured to, upon execution, direct an apparatus to at least determine whether to direct at least some traffic of at least one user equipment (UE) connected to a local area (or macro) access point (AP) to be connected to a macro (or local) AP. The apparatus is further directed to cause, in an instance in which it is determined to direct the at least some traffic of at least one UE to be connected to the macro (or local) AP, at least one signal to be transmitted to the at least one UE, the at least one signal being configured to direct the at least some traffic of the at least one UE to connect to the macro (or local) AP.

In another embodiment, a computer program product is provided that includes a non-transitory computer readable medium storing computer program code portions therein, the computer program code portions being configured to, upon execution, direct an apparatus to at least communicate with a local area (or macro) access point (AP), receive at least one signal, determine whether the signal comprises an indication to connect traffic to a macro (or local) AP, and connect at least some traffic to the macro (or local) AP in an instance in which the signal comprises an indication to connect at least some traffic to the macro (or local) AP.

In yet another embodiment, an apparatus is provided that includes means for determining whether to direct at least some traffic of at least one user equipment (UE) connected to a local area (or macro) access point (AP) to be connected to a macro (or local) AP. The apparatus further includes means for causing, in an instance in which it is determined to direct the at least some traffic of at least one UE to be connected to the macro (or local) AP, at least one signal to be transmitted to the at least one UE, the at least one signal being configured to direct the at least some traffic of the at least one UE to connect to the macro (or local) AP.

In an even further embodiment, an apparatus is provided that includes means for communicating with a local area (or macro) access point (AP), means for receiving at least one signal, means for determining whether the signal comprises an indication to connect traffic to a macro (or local) AP, and means for connecting at least some traffic to the macro (or local) AP in an instance in which the signal comprises an indication to connect at least some traffic to the macro (or local) AP.

BRIEF DESCRIPTION OF THE DRAWINGS

Figure 1:
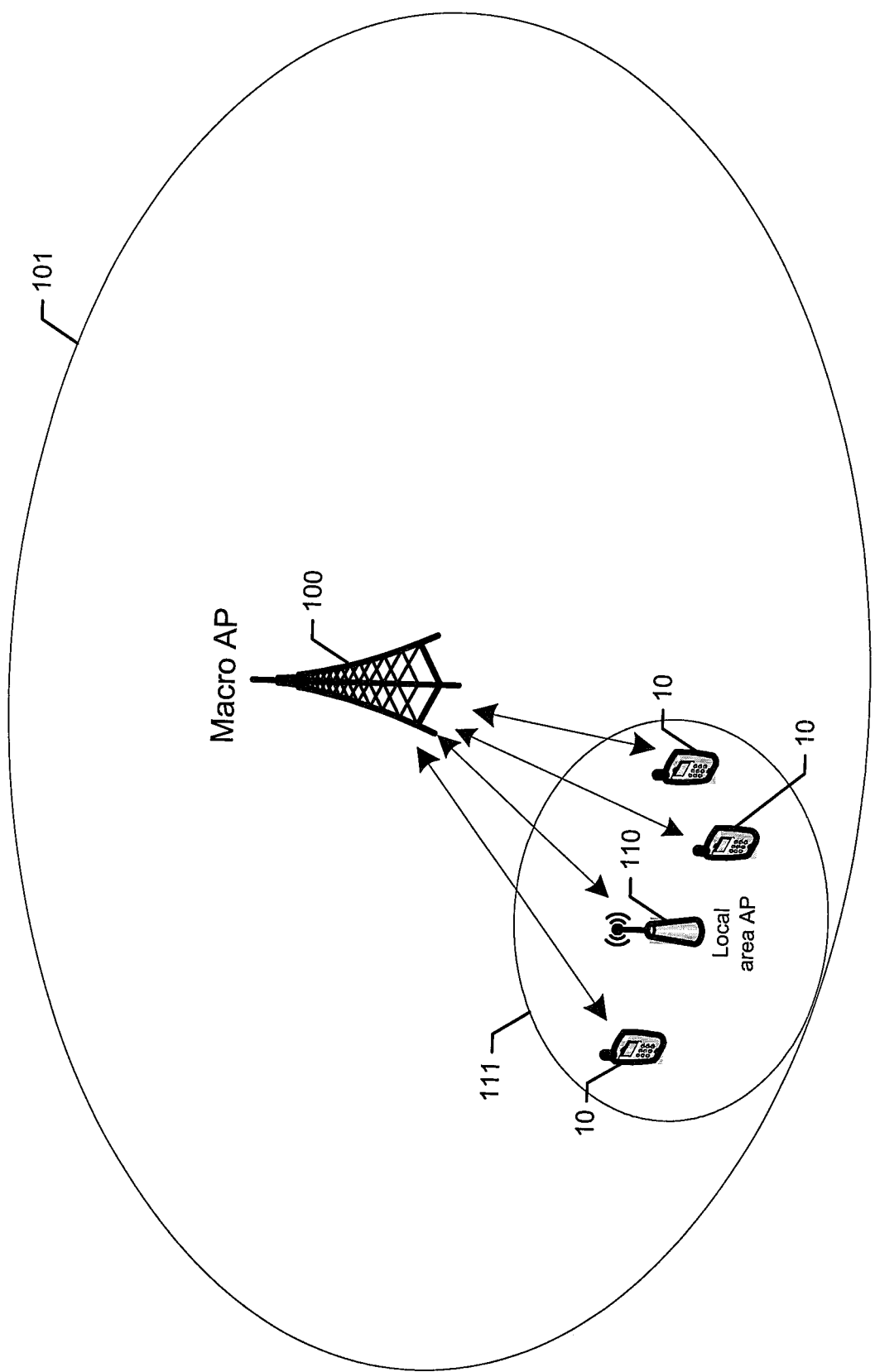
Figure 2:
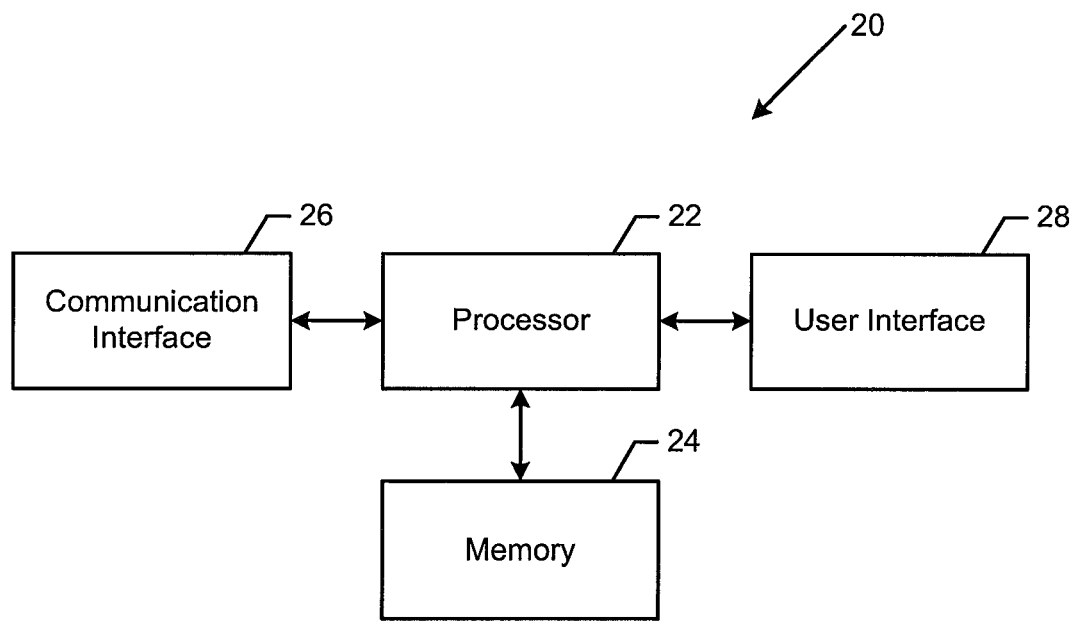
Figure 3:
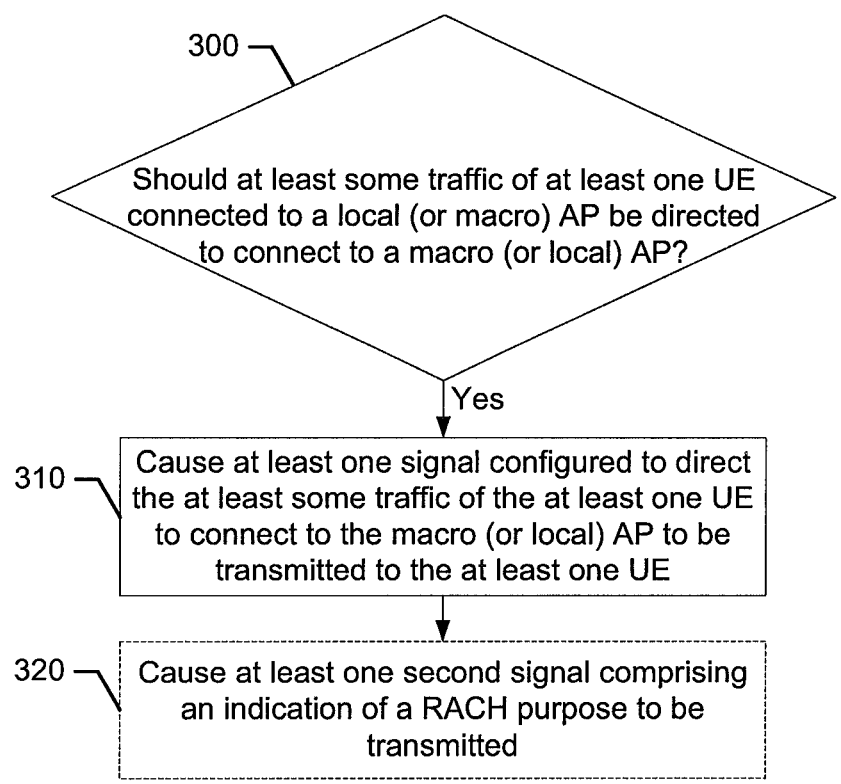
Figure 4:
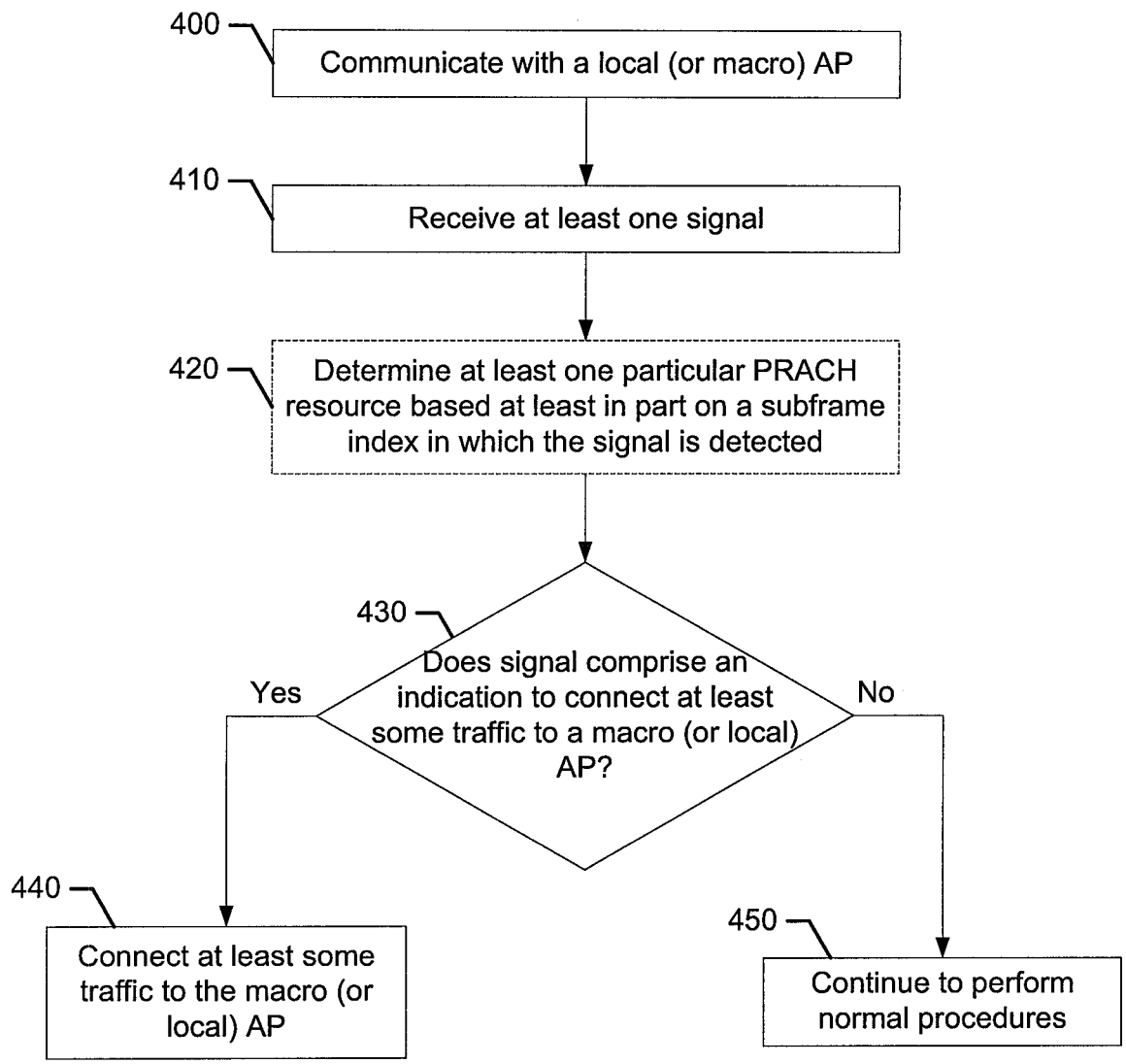

Having thus described certain example embodiments of the present disclosure in general terms, reference will now be made to the accompanying drawings, which are not necessarily drawn to scale, and wherein:

FIG. 1 is an illustration of a system which may benefit from embodiments of the present invention;

FIG. 2 is a block diagram of an apparatus that may be configured in accordance with an example embodiment of the present invention;

FIG. 3 is a flowchart depicting the operations performed by an apparatus embodied by or otherwise associated with an access point (AP);

FIG. 4 is a flowchart depicting the operations performed by an apparatus embodied by or otherwise associated with a user equipment (UE); and FIG. 5 is an example of a paging message configured in accordance with an example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

Referring now to FIG. 1, a system which may benefit from connection switching is depicted. As depicted, a macro access point (AP) 100 may serve a macro cell 101 and a one or more local area APs, such as local area AP 110, may serve one or more local area networks, such as local area network 111. The coverage area of a macro cell 101 may be larger than that of a given local area network, and may even overlap with or encompass one or more local area networks. As shown in FIG. 1, one or more UEs 10 may be in communication with the local area AP 110 and/or macro AP 100. In this regard, the system depicted in FIG. 1 may support communications between the UEs 10, and a network, such as a Universal Mobile Telecommunications System (UMTS) network, a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a Frequency-Division Multiplexing (FDM) network, e.g., an Orthogonal Frequency-Division Multiplexing (OFDM) network, a General Packet Radio Service (GPRS) network, WLAN network or other type of network, via one or more access points, such as the macro AP 100 and/or local area AP 110.

It will be understood that, as used herein, an AP, such as macro AP 100 or local area AP 110, may refer to any communication device which provides connectivity to a network. For example, an AP may refer to a base station, an access node, or any equivalent, such as a Node B, an evolved Node B (eNB), a relay node, a WLAN AP or other type of access point. According to an example embodiment, a local area AP may refer to an AP configured to provide a connection to a local area network, such as a Wireless Local Area Network (WLAN). Accordingly, a local area AP may, for example, comprise a WiFi AP, such as an AP configured to provide a local wireless connection according to the IEEE 802.11 standard. The term "user equipment" (UE) includes any mobile communication device such as, for example, a mobile telephone, portable digital assistant (PDA), pager, laptop computer, a tablet computer, or any of numerous other hand held or portable communication devices, computation devices, content generation devices, content consumption devices, data card, Universal Serial Bus (USB) dongle, or combinations thereof. The communications between the UE and any of the APs discussed herein may include the transmission of data via an uplink and/or downlink that is granted between the user equipment and the AP.

The macro and/or local area APs 100, 110, as well as any UEs 10, may embody or otherwise be associated with an apparatus 20 that is generally depicted in FIG. 2 and that may be configured in accordance with an example embodiment of the present invention as described below. However, it should be noted that the components, devices or elements described below may not be mandatory and thus some may be omitted in certain embodiments. Additionally, some embodiments may include further or different components, devices or elements beyond those shown and described herein.

As shown in FIG. 2, however, the apparatus 20 may include or otherwise be in communication with a processing system including processing circuitry, such as the processor 20 and, in some embodiments, the memory 24, which is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry may include a processor 22 and memory 24 that may be in communication with or otherwise control a communication interface 26 and, in some cases in which the apparatus is embodied by the user equipment 10, a user interface 28. As such, the processing circuitry may be embodied as a circuit chip (e.g., an integrated circuit chip) configured (e.g., with hardware, software or a combination of hardware and software) to perform operations described herein. However, in some embodiments taken in the context of an AP 100, 110 or a UE, the processing circuitry may be embodied as a portion of the AP or UE.

The user interface 28 (if implemented in embodiments of the apparatus 20 embodied by the user equipment 10) may be in communication with the processing circuitry to receive an indication of a user input at the user interface and/or to provide an audible, visual, mechanical or other output to the user. As such, the user interface 28 may include, for example, a keyboard, a mouse, a joystick, a display, a touch screen, a microphone, a speaker, and/or other input/output mechanisms.

The communication interface 26 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network and/or any other device or module in communication with the processing circuitry, such as between the UE and an AP 100, 110. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 24 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 22. Additionally or alternatively, the memory could be configured to store instructions, e.g., program code portions, for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 22 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 24 or otherwise accessible to the processor. As such, whether configured by hardware or by a combination of hardware and software, the processor may represent an entity (e.g., physically embodied in circuitry—in the form of processing circuitry) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

As noted in the Background section, offloading traffic to unlicensed bands, such as offloading traffic to WLANs, may be useful for mitigating cellular network loads. However, complications can arise when the UE needs to switch its connection back to the cellular network. For example, when a UE needs to return to cellular network due, for example, to a wireless link change or the UE moving out of WLAN coverage, some services may be running on the WLAN and the data session therefore should be switched to the cellular network without the user perceiving the change. Furthermore, if the UE is in an IDLE mode, the only way for an AP to direct the UE to establish a cellular connection may be paging. However, according to current network procedures, UEs must, after receiving a paging message, use a contention-based Random Access Channel (RACH) procedure to establish a connection, which may encounter collision and could be time-consuming.

Accordingly, various methods, apparatuses, and computer program products for managing wireless connection switching are described herein. According to one example embodiment, one or more signals may be provided to a UE that is presently connected to a local (or macro) AP, the signals being configured to direct at least some traffic of the UE to connect to, e.g., be served by, a macro (or local) AP. That is, the signals may be configured either to direct at least some traffic of a UE currently connected to a macro cell to connect to a local cell or to direct at least some traffic of a UE currently connected to a local area cell to connect to a macro cell. According to further embodiments, the one or more signals may take many different forms and may, according to certain example embodiments, encode further information such as the portion of the UEs traffic that should be served by the macro (or local) AP, a particular Physical Random Access Channel (PRACH) resource to be used by the UE to establish a connection with macro AP, and/or other types of information and/or parameters.

Thus, having described general concepts of the present invention, reference will now be made to FIGS. 3 and 4 so as to discuss example embodiments of the present invention in further detail. In this regard, the flowchart contained in FIG. 3, along with its accompanying discussion, pertains to operations performed by an apparatus, such as the apparatus 20 depicted in FIG. 2, embodied by or otherwise associated with an AP, such as the macro AP 100 depicted in FIG. 1. FIG. 4, along with its accompanying discussion, pertains to particular operations performed by an apparatus, such as the apparatus 20 depicted in FIG. 3, embodied by or otherwise associated with a US, such as one or more of the UEs 10 depicted in FIG. 1.

Turning first to FIG. 3, an apparatus 20 embodied by or otherwise associated with an AP, such as macro AP 100 or local area AP 110, may include means, such as the processing circuitry, the processor 22, the communications interface 26 or the like, for determining whether to direct at least some traffic of at least one UE connected to a local area (or macro) AP to be connected to a macro (or local) AP. See operation 300. Such a determination may, for example, be based on receiving an indication of unsatisfactory network performance for the at least one UE, an indication that the at least one UE is out of range (or nearly out of range) of the local area AP it is connected to, an indication of a link problem regarding the local AP, a quality of service (QoS) indication, a load level of the macro AP as compared to a threshold, or other such information which may tend to indicate that causing the UE to connect to the macro AP may be advantageous. Such information may, for example, be received from the local area AP or the one or more UEs or determined by the apparatus 20 embodied by or otherwise associated with the macro AP itself.

The apparatus 20 embodied by or otherwise associated with an AP, such as macro AP 100 or local area AP 110, may include means, such as those listed above, for causing, in an instance in which it is determined to direct at least some traffic of the at least one UE to be connected to the macro (or local) AP, at least one signal to be transmitted to the UE, the at least one signal being configured to direct at least some traffic of the at least one UE to connect to the macro (or local) AP from the local (or macro) AP. See operation 310. Further detail regarding the at least one signal according to example embodiments will now be discussed.

According to one example embodiment, the at least one signal may comprise a modified paging message. According to a further example embodiment, the paging message may include a switch-back paging indicator. According to another example embodiment, the paging message may include an indication of one or more dedicated PRACH parameters. In this way, the UE may use a dedicated preamble to trigger RACH, thereby avoiding contention failure and saving time. According to another example embodiment, the paging message may include an indication of what traffic is to be served by the macro AP and/or what traffic is to be served by the local area AP. In this way, some traffic, e.g., one or more data sessions, may continue to be served by the local AP, which other traffic, e.g., one or more other data sessions, may be served by the macro AP. According to another example embodiment, the paging message may include an indication of a link problem regarding the local area AP. That is, the paging message may indicate whether the connection switch was necessitated by, e.g., a WLAN link problem.

According to another example embodiment, the at least one signal may comprise a Downlink Control Information (DCI) message, such as a DCI format 1A message or a DCI format 1C message. The DCI message may, for example, be scrambled with a Paging Radio Network Temporary Identity (P-RNTI). According to a further example embodiment, one or more reserved bits in the DCI message, e.g., in the P-RNTI scrambled DCI format 1A message, may indicate whether the UE is to connect to the macro AP. For example, according to one embodiment, one bit in a 3-bit HARQ process number may be reserved for indicating whether the UE is to connect to the macro AP. Thus, if the reserved bit is, for example, '1,' the UE may determine that the instant paging is switch-back paging, i.e., that the UE is to connect to the macro AP. On the other hand, if the reserved bit is '0,' the UE may determine that the instant paging is normal, e.g., legacy, paging and, accordingly, that the UE should continue to perform normal procedures without connecting to the macro AP. It will be understood that '1' and '0' were arbitrarily chosen in the preceding example and that the example values of the reserved bit and their respective meaning could be reversed according to other examples.

According to another example embodiment, one or more new Paging Occasions (POs) may be defined for connection switching. That is, the at least one signal may, for example, be transmitted during a switch-back PO. The UE may, for example, monitor both normal POs and switch-back POs when connected to the local AP, e.g., when all its data services are being handled by the local AP. When paging is received in a normal PO, the UE may continue to perform normal procedures. According to a further example embodiment, different paging Radio Frames (PF) may be configured for normal paging and switch-back paging. The PF may still be linked to the UE ID, but, for example, with some offsets. According to yet another example embodiment, the macro AP may configure some dedicated periodic resources for switch back-paging for all UEs connected to a UE, and the macro AP may further indicate at least one resource for the UEs connected to the local AP upon directing the UEs to connect to the local AP. According to another example embodiment, the macro AP may configure a new "Switch" RNTI (SW-RNTI), and reuse the normal POs.

According to yet another example embodiment, a set of PRACH resources may be predefined or configured to a UE and the exact PRACH resource may be determined implicitly by the UE based on the subframe index in which the UE detects the paging message. In this way, reserving dedicated PRACH resources to a UE may be avoided. For example, four sets of PRACH resources may be defined as follows:

PRACH resource #0={ra-PreambleIndex1, ra-PRACH-MaskIndex1}
PRACH resource #1={ra-PreambleIndex2, ra-PRACH-MaskIndex2}
PRACH resource #2={ ra-PreambleIndex3, ra-PRACH-MaskIndex3}
PRACH resource #3={ ra-PreambleIndex4, ra-PRACH-MaskIndex4}

The UE may then determine the exact PRACH resource # k=X_sf mod 4, where X_sf is the subframe index (or radio frame index) in which UE detects the paging message. In this way, there is no need to indicate a dedicated PRACH resource in the paging message to a UE, which may save control overhead and may have less impact on paging messages, while at the same time allowing increased flexibility in PRACH resource assignment. It will be understood that all of the example embodiments discussed thus far may be employed either independently or jointly.

According to yet another example embodiment, the at least one signal may comprise newly-defined signaling. For example, the at least one signal may comprise new L1 signaling, a Medium Access Control (MAC) Control Element (CE), or a Radio Resource Control (RRC) message. According to another example embodiment, the at least one signal may comprise modified RRC signaling, such as an RRCConnectionReconfiguration and/or an RRCConnectionRelease message including a switch command and/or dedicated PRACH parameters. The switch command may, for example, include at least targeting local AP information. Regardless of the form that the at least one signal takes, it may be configured to direct the UE to switch either all or some of its traffic to the macro (or local) AP from the local (or macro) AP.

According to another example embodiment, the apparatus 20 embodied by or otherwise associated with an AP, such as macro AP 100 or local area AP 110, may further include means, such as the processing circuitry, the processor 22, the communications interface 26 or the like, for causing at least one second signal to be transmitted, the signal comprising an indication of a RACH purpose. See operation 320. The at least one second signal may, for example, be transmitted in an instance in which the AP had transmitted a signal directing the UE to connect to a macro AP during a RACH procedure. According to one example embodiment, the at least one second signal may comprise a msg 2. For example, the at least one second signal may comprise a Random Access Response (RAR) message and the indication of the RACH purpose may, for example, comprise a reserved bit in a Protocol Data Unit (PDU) of the RAR message. According to another example embodiment, the at least one second signal may comprise a msg 4. For example, the at least one second signal may comprise an RRCConnectionSetup message.

Turning now to FIG. 4, an apparatus 20 embodied by or otherwise associated with a UE, such as one of the UEs 10 depicted in FIG. 1, may include means, such as the processing circuitry, the processor 22, the communications interface 26 or the like, for communicating with a local AP. See operation 400. The apparatus 20 may, for example, cause data to be transmitted and/or received to and/or from the local AP. Such data may, for example, be transmitted and/or received as part of one or more data sessions. The apparatus 20 embodied by or otherwise associated with the local AP may further include means, such as those described above, for receiving at least one signal. See operation 410. The at least one signal may, for example, comprise one or more of any of the signals discussed above as being caused to be transmitted by the apparatus 20 embodied by or otherwise associated with the AP.

The apparatus 20 embodied by or otherwise associated with a UE may further include means, such as those discussed above, for determining at least one particular PRACH resource based at least in part on a subframe index in which the at least one signal is detected. See operation 420. Thus, as discussed above, a set of PRACH resources may be predefined or configured to the UE, such that the apparatus 20 embodied by or otherwise associated with the UE may determine an exact PRACH resource from the set based on the subframe index in which the apparatus detects the signal, such as a paging message.

The apparatus 20 embodied by or otherwise associated with a UE may further include means, such as those discussed above, for determining whether the signal comprises an indication to connect to a macro (or local) AP. See operation 430. As discussed above, the at least one signal may take many forms and may indicate that at least some traffic of the UE is to connect to the macro (or local) AP in many ways. The apparatus 20 embodied by or otherwise associated with the UE may further include means, such as those discussed above for connecting to the macro (or local) AP in an instance in which the at least one signal comprises an indication to connect to the macro (or local) AP and for continuing to perform normal procedures in an instance in which the at least one signal does not comprise an indication to connect to the macro (or local) AP. See operations 440 and 450.

Having thus described the various operations which may be performed by apparatuses respectively embodied by or otherwise associated with an AP and a UE and configured to manage wireless connection switching, an example scenario will now be described with reference to the system of FIG. 1 and the example paging message of FIG. 5. Rows specifically related to connection switching are indicated with underlining in FIG. 5.

In this regard, the three UEs 10 (referred to now as UE1, UE2 and UE3) may first be offloaded to the local area AP 110 from the macro AP 100. If contention becomes competitive for the UEs 10 connected to the local area AP 110, causing the high QoS requirements of one of the UE's traffic to not be met e.g. UE1's video traffic, and/or if UE2 is moving out of the local area AP's 110 coverage area, the local area AP 110 may inform the macro AP 100 of these events. In response, the Macro AP 100 may send a modified Paging message, such as the paging message depicted in FIG. 5, to UE1 and UE2 to direct UE1 to switch its video traffic to the macro AP from the local AP and direct UE2 to switch entirely to the macro AP from the local area AP.

After decoding PagingRecordList, UE1 and UE2 find their ID in the record list, so they may also decode new Paging-v12xx-IEs to check whether this paging is normal paging or switch-back paging. After decoding PagingRecordList, UE3 and UE4 don't find their ID in the record list, so they don't need to further decode new Paging-v12xx-IEs. Any legacy UEs will not decode Paging-v12xx-IEs at all.

Finally, UE1 and UE2 will start to establish connection with the macro AP and switch their traffic back the macro AP from the local AP.

As discussed above, FIGS. 3 and 4 are flowcharts illustrating operations performed by a method, apparatus and computer program product, such as apparatus 20 of FIG. 2 in accordance with example embodiments of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described herein may be embodied by program code instructions, e.g., program code portions. In this regard, the program code instructions which embody the procedures described above may be stored by a memory 24 of an apparatus employing an embodiment of the present invention and executed by a processor 22 in the apparatus. As will be appreciated, any such program code instructions may be loaded onto a computer or other programmable apparatus (e.g., hardware) to produce a machine, such that the resulting computer or other programmable apparatus provides for implementation of the functions specified in the flowchart blocks. These program code instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The program code instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 3 and 4, when executed, convert a computer or processing circuitry into a particular machine configured to perform an example embodiment of the present invention. Accordingly, the operations of FIGS. 3 and 4 define an algorithm for configuring a computer or processing circuitry, e.g., processor, to perform an example embodiment. In some cases, a general purpose computer may be provided with an instance of the processor which performs the algorithms of FIGS. 3 and 4 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein.

Example embodiments of the present invention may provide many benefits over the prior art. For example, certain example embodiments described above may enable fast and reliable connection switching, such as from WLAN to LTE. Furthermore, example embodiments may provide such connection switching with no backward compatibility issues and with few changes to existing network specifications.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method, implemented by an apparatus, comprising:
determining, by processing circuitry of the apparatus, whether to direct at least some traffic of at least one user equipment (UE) that is currently connected to a first type of access point (AP) to be connected to a second type of AP that is different than the first type of AP; and
causing, in an instance in which it is determined to direct the at least some traffic of the at least one UE to be connected to the second type of AP, a paging message to be transmitted to the at least one UE, the paging message being configured to direct the at least some traffic of the at least one UE to connect to the second type of AP which is a WiFi AP,
wherein the first type of AP operates using a cellular network and using a different communication protocol and different communication frequency than the second type of AP which uses a WiFi network, and
wherein bidirectional communication occurs between the at least one UE and the first type of AP while concurrent bidirectional communication occurs between the at least one UE and the second type of AP,
wherein the method further comprises causing, by the processing circuitry, in an instance in which it is determined to direct the at least some traffic of the at least one UE to be connected to the second type of AP, a Downlink Control Information DCI message to be transmitted to the at least one UE,
wherein the DCI message comprises a reserved bit indicating that the UE is to connect to the macro AP, and
wherein the reserved bit is included in a plurality of bits representing a Hybrid Automatic Repeat Request (HARQ) process number.

2. The method according to claim 1, wherein the paging message configured to direct only a portion of the traffic of the at least one UE to connect to the second type of AP.

3. An apparatus comprising:
processing circuitry configured to
determine whether to direct at least some traffic of at least one user equipment (UE) that is currently connected to a first type of access point (AP) to be connected to a second type of AP that is different than the first type of AP; and
cause, in an instance in which it is determined to direct the at least some traffic of the at least one UE to be connected to the second type of AP, a paging message to be transmitted to the at least one UE, the paging message being configured to direct the at least some traffic of the at least one UE to connect to the second type of AP which is a WiFi AP,
wherein the first type of AP operates using a cellular network and using a different communication protocol and different communication frequency than the second type of AP which uses a WiFi network, and
wherein bidirectional communication occurs between the at least one UE and the first type of AP while concurrent bidirectional communication occurs between the at least one UE and the second type of AP,
wherein the processing circuitry is configured to cause, in an instance in which it is determined to direct the at least some traffic of the at least one UE to be connected to the second type of AP, a Downlink Control Information DCI message to be transmitted to the at least one UE,
wherein the DCI message comprises a reserved bit indicating that the UE is to connect to the macro AP, and wherein the reserved bit is included in a plurality of bits representing a Hybrid Automatic Repeat Request (HARQ) process number.

4. The apparatus of claim 3, wherein the paging message comprises a switch-back paging indicator.

5. The apparatus of claim 3, wherein the paging message comprises an indication of one or more dedicated Physical Random Access Channel (PRACH) parameters.

6. The apparatus of claim 3, wherein the paging message comprises an indication of what traffic is to be served by the second type of AP which is a local AP connected to the UE.

7. The apparatus of claim 3, wherein the paging message comprises an indication of a link problem regarding a local area AP.

8. The apparatus of claim 3, wherein a set of PRAM resources are predefined for the at least one UE, a particular PRACH resource being determined by the UE based on a subframe index in which the UE detects the paging message.

9. The apparatus of claim 3, wherein the DCI message comprises a DCI format 1A/1C message.

10. The apparatus of claim 3, wherein the DCI message is scrambled with a Paging Radio Network Temporary Identity (P-RNTI).

11. The apparatus of claim 3, wherein the paging message is transmitted during a switch-back Paging Occasion (PO).

12. The apparatus of claim 3, wherein the apparatus being further directed to cause transmission of, in an instance in which at least one first signal is transmitted to the UE during a RACH procedure, at least one second signal comprising an indication of a RACH purpose.

13. The apparatus of claim 12, wherein the at least one second signal comprises a msg 2.

14. The apparatus of claim 12, wherein the at least one second signal comprises a Random Access Response (RAR) message and further wherein the indication of the RACH purpose comprises a reserved hit in a Protocol Data Unit (PDU) of the RAR message.

15. The apparatus of claim 12, wherein the at least one second signal comprises a msg 4.

16. A computer program product comprising at least one non-transitory computer-readable medium having program code portions embodied therein, the program code portions being configured to, upon execution, cause an apparatus to at least:
  determine whether to direct at least some traffic of at least one user equipment (UE) that is currently connected to a first type of access point (AP) to be connected to a second type of AP that is different than the first type of AP, the first type of AP being one of a local AP and a macro AP and the second type of AP being the other one of the local AP and the macro AP that is different than the first type of AP; and
  cause, in an instance in which it is determined to direct the at least some traffic of the at least one UE to be connected to the second type of AP, a paging message to be transmitted to the at least one UE, the paging message being configured to direct the at least some traffic of the at least one UE to connect to the second type of AP which is a WiFi AP,
  wherein the first type of AP operates using a cellular network and using a different communication protocol and different communication frequency than the second type of AP which uses a WiFi network,
  wherein bidirectional communication occurs between the at least one UE and the first type of AP while concurrent bidirectional communication occurs between the at least one UE and the second type of AP,
  wherein the program code portions are further configured to, upon execution, cause the apparatus to, in an instance in which it is determined to direct the at least some traffic of the at least one UE to be connected to the second type of AP, a Downlink Control Information DCI message to be transmitted to the at least one UE,
  wherein the DCI message comprises a reserved bit indicating that the UE is to connect to the macro AP, and
  wherein the reserved bit is included in a plurality of bits representing a Hybrid Automatic Repeat Request (HARQ) process number.

\* \* \* \* \*